UNITED STATES PATENT OFFICE 2,650,879

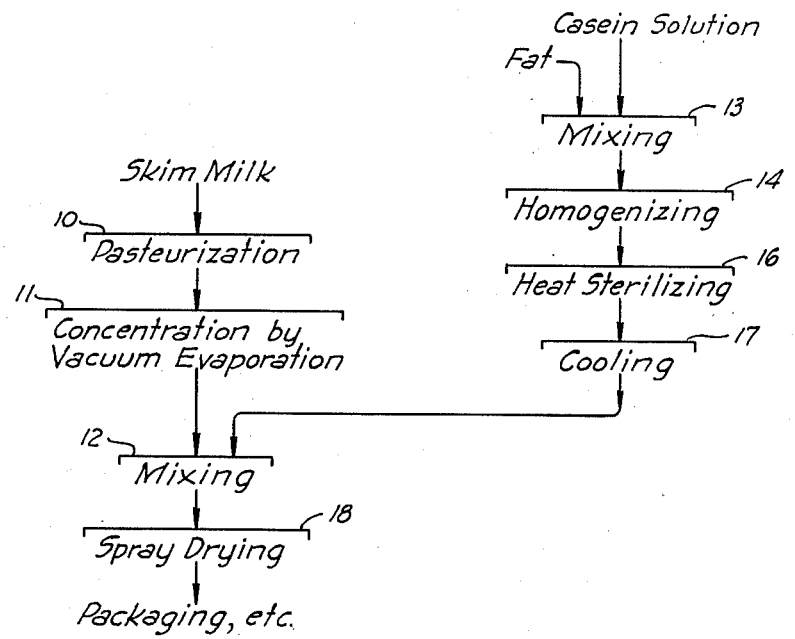

MILK PRODUCT AND PROCESS

David D. Peebles, Hillsborough, and Murray D. Girvin, San Anselmo, Calif., assignors to Western Condensing Company, San Francisco, Calif., a corporation of California Application October 23, 1950, Serial No. 191,691

2 Claims. (Cl. 99—63)

This invention relates generally to processes for the manufacture of dry powdered milk products, and to products resulting from such processes.

Of the various milk products which have been manufactured in dry powdered form, it has been recognized that products containing substantial amounts of fat together with nonfat solids are unsatisfactory in many respects. For example dried whole milk powder, which contains about 26% butterfat, is unsatisfactory with respect to its flavor, palatability and keeping qualities, which is attributed to the methods used for its manufacture. The prevailing method now accepted as best practice for the manufacture of whole milk powder involves flash heating of the milk to a relatively high temperature of the order of 250° F., after which the material is concentrated by vacuum evaporation and spray dried. High temperature heating has been deemed necessary for the purpose of developing certain antioxidants which presumably tend to promote preservation of the spray dried material. Unfortunately however such heating develops an unmistakable cooked flavor, which is generally attributed to caramelization of lactose and denaturing or coagulation of protein. Spray dried material produced by such methods has poor keeping properties and when exposed to the air it rapidly deteriorates, as is evidenced by development of an off flavor and oder. To prevent such rapid deterioration it has been customary to market the powder in sealed containers, with vacuumizing and gassing with nitrogen before the containers are sealed. While such packaging prevents the rapid deterioration which is experienced when the powder is exposed to the atmosphere, it does not preserve the powder indefinitely, and some deterioration continues to take place during storage. The same difficulties just mentioned are experienced in the manufacture of other dry powdered milk products having a substantial fat content, as for example powdered materials intended for use in the manufacture of frozen confections.

It is an object of the present invention to provide a new process for the manufacture of dry powdered milk products having a substantial fat content, and particularly a process which will produce greatly improved powdered products, having reference particularly to flavor characteristics and keeping qualities.

It is a further object of the invention to provide a new dry powdered composition containing nonfat milk solids together with a substantial fat content, and which is characterized by superior flavor, palatability and keeping qualities.

A further object of the invention is to provide a high quality whole milk powder having its protein content substantially undenatured.

Another object of the invention is to provide a novel process for the manufacture of a superior whole milk powder, which will overcome the above mentioned disadvantages of prior processes.

Further objects and features of the invention will appear from the following description in which the preferred manner of practicing the invention has been set forth in detail.

The present invention will be described as applied to the manufacture of whole milk powder, with the understanding that the invention can be employed for the manufacture of other powdered milk products containing nonfat solids together with a substantial fat content.

In general the present invention employs a lacteal material as a source of nonfat milk solids and which is processed without development of off flavor. A separately prepared water-fat emulsion is mixed with the lacteal material and then the mixture is dried as by spray drying to form a powdered product.

Referring to the flow sheet of the accompanying drawing, we can employ fresh edible skim milk as a source of the nonfat milk solids, and preferably skim milk having a low residual fat content and a relatively low acidity. Thus it is desirable that the fat content be not more than about 0.2%, and preferably of the order of 0.15% or less. The hydrogen ion concentration should be of the order of pH 6.8 to 7. Such skim milk is ordinarily produced in the dairy industry by centrifuging whole milk for the removal of the cream content.

The fresh skim milk is subjected to "flash" pasteurization at 10 as by heating the material to a temperature of 165° F. for a period of 30 seconds, followed by rapid cooling. If desired "holding" pasteurization can be used, as by heating to a temperature of the order of from 142 to 145° F., for a period of 30 minutes, followed by rapid cooling. Flash pasteurization is preferred because it can be carried out continuously, and because it appears to have less detrimental effect upon the milk protein. Such pasteurization is sufficient to insure against bacterial contamination, but the temperature and time relationship involved do not result in any substantial denaturing or coagulation of the milk protein or caramelization of the lactose. In other words no changes occur to the heat sensitive components of the milk solids which have the effect of impairing flavor or palatablity.

Following pasteurization at 10 it is desirable to subject the skim milk to concentration by vacuum evaporation at 11 to facilitate subsequent drying. Evaporation may be carried out to the extent of producing a concentrate containing from about 35 to 55% solids. During vacuum evaporation care should be taken to avoid subjecting the material to such temperature as would detrimentally affect the heat sensitive components. By the maintenance of proper vacuums in the various evaporating stages the treatment temperatures can be maintained well below about 150° F.

The skim milk concentrate from step 11 is then mixed at 12 with a special water-fat emulsion separately prepared as indicated in the flow sheet. One method which can be employed for the preparation of a suitable emulsion is to intermix a suitable fat with a solution of sodium caseinate, as indicated in step 13. The proportions can vary as follows:

45 to 89% water.
10 to 52% fat.
1.2 to 3.1% sodium caseinate.

Sodium caseinate has been found to be a highly desirable emulsifying agent for reasons presently to be explained. Preferably the caseinate solution is prepared by dissolving edible casein in warm water together with sodium bicarbonate, after which the solution is heated to a temperature of the order of 190 to 200° F. to evolve carbon dioxide. The proportions should be such that the pH value of the final emulsion is below about pH 8 and preferably within the range of pH 6.8 to 7.0. Although sodium bicarbonate is preferred the casein can be dissolved in a solution of sodium carbonate, and the heating step omitted.

The mixture from 13 is subjected to homogenizing at 14, preferably at an elevated temperature of the order of from 120 to 150° F. Sufficient pressures are employed to form a stable emulsion, with the bulk of the fat globules having a size of the order of 3 microns or less.

Following homogenizing, the emulsion is subjected to heat sterilization at 16, which can be carried out by heating the material to an elevated temperature of the order of 240 to 260° F. with a retention period of from 15 to 10 minutes. Following heat sterilization the emulsion is cooled at 17, and is then in condition for use in the mixing operation 12.

As a result of mixing at 12 with the skim milk concentrate, a homogeneous milk is produced in which the fat globules are dispersed throughout the material. Immediately following mixing and blending at 12 the material is subjected to the spray drying operation 18, which can be carried out by the use of conventional spray drying equipment such as is used in the drying of milk products.

The spray dried powder produced can be packaged in any desired manner for distribution to the trade. Following conventional practice the powder can be introduced into metal cans, and then subjected to vacuumizing and gassing with nitrogen. The containers are then hermetically sealed.

The fat content employed can be of vegetable origin, such as hydrogenated cottonseed oil, having a melting point of the order of 90 to 110° F., or we may employ unsweetened butter or butter oil. When unsweetened butter is employed it is desirable that the lactose and protein contents be reduced to a minimum as by washing. Butter oil is a relatively purified form of butterfat produced by the washing and centrifuging of melted butter. Animal fats such as tallow and lard can also be employed, particularly for products intended for animal consumption.

As a flavoring suitable known butter flavorings can be added. Various commercial products can be employed for this purpose, such as a product containing ethyl butyrate or like esters, caprylic acid, bitter almond and like essential oils, and traces of aldehydes and ketones. Also we have used cultured butter flavors.

When butter or butter oil is employed it is desirable to add a small amount of a suitable antioxidant, such as 0.015% of Tocopherol, or 0.005% of butylated hydroxyanisole, or mixtures of such substances. This serves to prevent off flavor during high temperature sterilization.

In order to supplement the vitamin content of the final powdered product, it is desirable to add fat soluble vitamins to the emulsion. Thus vitamin concentrates such as carotin, vitamin A and vitamin D can be added at 13 whereby such vitamins are dissolved in the fat of the emulsion.

Small amounts of agents serving to increase viscosity can be added to the emulsion before or after homogenizing, as for example gums or alginates. Thus sodium alginate can be added in amounts up to about 0.15%.

Irrespective of the proportions employed in the preparation of the water-fat emulsion, the amount added to the skim milk concentrate should be such as to produce the desired fat content in the final product. Thus assuming that the final product is to have a fat content corresponding to commercial spray dried whole milk, the amount of emulsion added should be such that about 26% of fat is provided in the final spray dried material.

Desirable features of our process are as follows: The water-fat emulsion does not contain any components which are sensitive to heat treatment, and therefore heat sterilization in the preparation of the emulsion does not detrimentally affect the flavor or quality of the final dry powdered material. The sodium caseinate used in preparation of the water-fat emulsion serves to form fat globules in which a caseinate membrane serves to separate the fat-liquid interfaces. Due to this or other features, it appears that the fat content and possibly other ingredients are protected against detrimental oxidation. In connection with oxidation of the fat and other ingredients of the whole milk powder, we have reference not only to oxidation because of exposure to atmospheric oxygen, but also to auto-oxidation which tends to take place in fat containing milk products.

Because of the above described features our product has keeping properties superior to conventional spray dried whole milk, and such keeping properties are made possible without high temperature heat treatment of the nonfat milk solids. Therefore the final product does not possess any off-flavor, and particularly does not possess the cooked or caramelized flavors commonly characteristic of conventional whole milk powder.

Our powdered product can be readily reconstituted with water to form a liquid whole milk which closely simulates natural whole milk. In flavor and palatability. Such reconstituted milk can be used in the same manner as fresh whole milk. Because the protein of the skim milk is not denatured or heat coagulated to any substantial extent, it is in ready assimilable form, thus enhancing its value for human consumption.

A specific example of our process is as follows: Raw skim milk at pH 7.0 was subjected to flash pasteurization as previously described, and was concentrated by vacuum evaporation to produce a concentrate containing 45% solids. 1,280 grams of edible casein (in dry granular form) was dissolved in 32,300 grams of water at about 160° F., together with 62 grams of sodium bicarbonate. The solution thus formed was heated to a temperature of 190° F. for a period of 60 minutes, and then cooled to 160° F. There was then added 40 grams of sodium alginate, 22,700 grams of melted hydrogenated cottonseed oil (at 120 to 140° F.), 2.1 grams of butter flavoring, and fat soluble vitamin concentrates as follows:

12,000 International units carotin per pound of fat.
3,000 International units vitamin A as vitamin A alcohol per pound of fat.
5,000 International units vitamin D concentrate in irradiated ergosterol per pound of fat.

All of the above ingredients were thoroughly intermixed and then whipped by agitation to homogeneously mix the ingredients. The material was then homogenized at a temperature of 140° F. by passing the same through a two valve Manton-Gaulin homogenizer. The pressure drop across each of the two valves was 2000 p. s. i. for the first pass and for the second pass 1500 p. s. i. The material produced by such homogenization was a homogenous emulsion in the form of a liquid. It was then sterilized by heating to 240° F. over a period of 15 minutes, held at 240° F. for 14 minutes and then cooled to near room temperature in a period of about 6 minutes. The pH value of the emulsion immediately before and after heat sterilization was about pH 7.0.

The emulsion prepared as described above analyzed as follows:

57.776% water.
2.25% sodium caseinate.
40% hydrogenated fat.
0.07% sodium alginate.
0.004% vitamin concentrates and flavoring.

The above emulsion was mixed with the skim milk concentrate in the proportions of 1.89 parts of the concentrate to 1.0 part of the emulsion (by volume), and immediately the material was fed to the atomizer of a spray drier to produce a dry powdered product. The final product was of high quality, with good keeping properties and being free of cooked or other off flavors.

As previously stated our invention is applicable to the manufacture of various powdered products containing milk solids not fat, including milk protein and lactose, together with a substantial fat content. Thus instead of using ordinary fresh skim milk, we may utilize a skim milk which is demineralized by contact with ion exchange resins, as disclosed in Patent No. 2,465,906.

It is also possible to remove a part of the lactose content, as by suitable lactose crystallizing methods, when it is desired to produce a final product having a reduced lactose content. In some instances it may be desirable to add lactose or other sugars to the skim milk, in order to increase the lactose content of the final product, or to sweeten the flavor. Materials such as alginates and gelatin can be added to the nonfat milk solids to produce a material suitable for special purposes, as for example for the manufacture of frozen confection.

Reference is made to our copending application Serial No. 183,188 filed September 5, 1950, and entitled "Fat Emulsion and Method of Manufacture."

We claim:

1. In a process for the manufacture of a dry powdered milk product having both fat and nonfat milk solids, the steps of pasteurizing fresh skim milk having its protein content substantially undenatured, subjecting the pasteurized milk to vacuum evaporation to concentrate the same, mixing the concentrate with a water-fat emulsion produced by emulsifying fat in water together with sodium caseinate, the emulsion comprising from 45 to 89% water, 10 to 52% fat, and from 1.2 to 3.1% sodium caseinate and then spray drying the resulting blended material to form a stable fat containing powdered product.

2. As a new article of manufacture, a dry powdered material produced by the process of claim 1.

DAVID D. PEEBLES.
MURRAY D. GIRVIN.

References Cited in the file of this patent

UNITED STATES PATENTS

| Number | Name | Date |
|---|---|---|
| 746,502 | Hall | Dec. 8, 1903 |
| 1,190,369 | Beckman et al. | July 11, 1916 |
| 1,302,486 | Dunham | Apr. 29, 1919 |
| 1,403,405 | Habbema | Jan. 10, 1922 |
| 2,392,401 | North et al. | Jan. 8, 1946 |